US011306033B2

(12) United States Patent
Lati et al.

(10) Patent No.: US 11,306,033 B2
(45) Date of Patent: Apr. 19, 2022

(54) PROCESS FOR THE PRODUCTION OF POTASSIUM SULPHATE AND MAGNESIUM SULPHATE FROM CARNALLITE AND SODIUM SULPHATE

(71) Applicant: Dead Sea Works Ltd., Beer Sheva (IL)

(72) Inventors: Joseph Lati, Lehavim (IL); Khalil Abu Rabeah, Beersheba (IL); Ofir Cohen, Arad (IL); Einat Vizenberg, Arad (IL); Natalia Geinik, Arad (IL)

(73) Assignee: DEAD SEA WORKS LTD., Beer Sheva (IL)

( * ) Notice: Subject to any disclaimer, the term of this patent is extended or adjusted under 35 U.S.C. 154(b) by 183 days.

(21) Appl. No.: 16/468,380

(22) PCT Filed: Dec. 15, 2017

(86) PCT No.: PCT/IL2017/051354
§ 371 (c)(1),
(2) Date: Jun. 11, 2019

(87) PCT Pub. No.: WO2018/109773
PCT Pub. Date: Jun. 21, 2018

(65) Prior Publication Data
US 2019/0359535 A1 Nov. 28, 2019

Related U.S. Application Data

(60) Provisional application No. 62/435,760, filed on Dec. 17, 2016.

(51) Int. Cl.
C05D 1/02 (2006.01)
C01D 5/12 (2006.01)
C01D 5/16 (2006.01)
C05D 1/04 (2006.01)

(52) U.S. Cl.
CPC ............... *C05D 1/02* (2013.01); *C01D 5/12* (2013.01); *C01D 5/16* (2013.01); *C05D 1/04* (2013.01)

(58) Field of Classification Search
None
See application file for complete search history.

(56) References Cited

U.S. PATENT DOCUMENTS

| | | | |
|---|---|---|---|
| 2,136,996 A | 11/1938 | Wiedbrauck |
| 2,138,827 A | 12/1938 | Bailey |
| 2,997,171 A | 8/1961 | Samsel |
| 3,043,652 A | 7/1962 | Schytil |
| 3,332,470 A | 7/1967 | Chirico |
| 3,332,827 A | 7/1967 | Griffith |
| 3,532,621 A | 10/1970 | Hough |
| 3,548,046 A | 12/1970 | Savage |
| 3,711,254 A | 1/1973 | McGowan |
| 3,876,387 A | 4/1975 | Coulson |
| 3,877,920 A | 4/1975 | Carlberg |
| 4,068,718 A | 1/1978 | Cooke, Jr. |
| 4,129,642 A | 12/1978 | Neitzel |
| 4,283,423 A | 8/1981 | Watkins |
| 4,427,068 A | 1/1984 | Fitzgibbon |
| 4,963,231 A | 10/1990 | Ryham |
| 5,112,379 A | 5/1992 | Young |
| 5,174,804 A | 12/1992 | Rehberg |
| 5,651,888 A | 7/1997 | Shimizu |
| 6,284,278 B1 | 9/2001 | Waldman |
| 6,287,496 B1 | 9/2001 | Lownds |
| 6,454,979 B1 | 9/2002 | Phinney |
| 9,592,514 B2 | 3/2017 | Kaps |
| 2002/0109736 A1 | 8/2002 | Chailleux |
| 2002/0121117 A1 | 9/2002 | Hartmann |
| 2004/0139992 A1 | 7/2004 | Murkute |
| 2005/0072724 A1 | 4/2005 | Nakayama |
| 2005/0276905 A1 | 12/2005 | Xing |
| 2006/0003893 A1 | 1/2006 | Taylor |
| 2006/0144789 A1 | 7/2006 | Cath |
| 2006/0148646 A1 | 7/2006 | Taylor |
| 2008/0223098 A1 | 9/2008 | Taulbee |
| 2009/0261040 A1 | 10/2009 | Pruet |
| 2009/0272692 A1 | 11/2009 | Kurth |

(Continued)

FOREIGN PATENT DOCUMENTS

| BR | 102012031210 | 1/2015 |
|---|---|---|
| CN | 1076435 A | 9/1993 |

(Continued)

OTHER PUBLICATIONS

Bichara et al, FR 2583412, English Translation (Year: 1986).*
Gao et al, CN 106082279, English Translation (Year: 2016).*
Office Action data dated May 19, 2020 for U.S. Appl. No. 16/343,900 (pp. 1-6).
Office Action dated Apr. 7, 2020, for U.S. Appl. No. 16/343,900 (pp. 1-7).
Office Action dated Feb. 11, 2020, for U.S. Appl. No. 15/570,753 (pp. 1-9).
Office Action dated May 22, 2020 for U.S. Appl. No. 15/570,753 (pp. 1-11).

(Continued)

*Primary Examiner* — Colin W. Slifka
(74) *Attorney, Agent, or Firm* — Greaser Associates International Inc; D'vorah Graeser

(57) ABSTRACT

According to some embodiments there is provided a process for the recovery of SOP from Sulphate bearing mineral and Carnallite or Sylvenite, comprising: Dissolving Carnallite in water to obtain Sylvenite and high Magnesium Chloride brine; Adding Sodium Sulphate to said Carnallite to produce mixture of Kainte\Leonite, KCl and NaCl precipitant and brine containing Mg $Cl_2$, KCl, NaCl; Separating the NaCl from the mixture; Obtaining a precipitant mixture of Leonite with KCl; Filtering said Leonite and washing with water to yield pure mixture of Leonite with KCl; Adding KCl to the Leonite with the KCl; and Decompose said Leonite with the KCl to SOP.

7 Claims, No Drawings

(56) References Cited

U.S. PATENT DOCUMENTS

| | | |
|---|---|---|
| 2010/0213129 A1 | 8/2010 | Jones |
| 2010/0224476 A1 | 9/2010 | Cath |
| 2011/0017666 A1 | 1/2011 | Cath |
| 2011/0064853 A1 | 3/2011 | Maeki |
| 2011/0123420 A1 | 5/2011 | Phinney |
| 2011/0257788 A1 | 10/2011 | Wiemers |
| 2011/0315632 A1 | 12/2011 | Freije, III |
| 2013/0001162 A1 | 1/2013 | Yangali-Quintanilla |
| 2013/0264260 A1 | 10/2013 | Heinzl |
| 2014/0001122 A1 | 1/2014 | Schultz |
| 2014/0175011 A1 | 6/2014 | Benton |
| 2014/0223979 A1 | 8/2014 | Wiseman |
| 2014/0245803 A1 | 9/2014 | Forsythe |
| 2014/0260467 A1 | 9/2014 | Peacock |
| 2015/0014232 A1 | 1/2015 | McGinnis |
| 2015/0101987 A1 | 4/2015 | Yeh |
| 2016/0060182 A1 | 3/2016 | Cook |
| 2017/0305805 A1 | 10/2017 | Farnworth |
| 2018/0179117 A1 | 6/2018 | Socolovsky |

FOREIGN PATENT DOCUMENTS

| | | |
|---|---|---|
| CN | 1083800 | 3/1994 |
| CN | 1091990 A | 9/1994 |
| CN | 1093695 A | 10/1994 |
| CN | 1236765 A | 12/1999 |
| CN | 1297371 A | 5/2001 |
| CN | 1314308 A | 9/2001 |
| CN | 1387497 | 12/2002 |
| CN | 1407957 A | 4/2003 |
| CN | 1485124 | 3/2004 |
| CN | 1548371 A | 11/2004 |
| CN | 1690023 A | 11/2005 |
| CN | 1715258 A | 1/2006 |
| CN | 1793064 A | 6/2006 |
| CN | 1997721 A | 7/2007 |
| CN | 101608168 | 12/2009 |
| CN | 101772377 A | 7/2010 |
| CN | 101792334 A | 8/2010 |
| CN | 101844949 A | 9/2010 |
| CN | 101993270 A | 3/2011 |
| CN | 101993317 A | 3/2011 |
| CN | 102001899 A | 4/2011 |
| CN | 102304003 | 1/2012 |
| CN | 102304003 A | 1/2012 |
| CN | 102464500 | 5/2012 |
| CN | 102464508 | 5/2012 |
| CN | 103011958 A | 4/2013 |
| CN | 103688788 A | 4/2014 |
| CN | 103930387 A | 7/2014 |
| CN | 104016379 A | 9/2014 |
| CN | 104211545 | 12/2014 |
| CN | 104341228 | 2/2015 |
| CN | 104609967 | 5/2015 |
| CN | 104609967 A | 5/2015 |
| CN | 105130645 A | 12/2015 |
| CN | 105263614 A | 1/2016 |
| CN | 106082279 A | 11/2016 |
| CN | 106495811 A | 3/2017 |
| CN | 106536033 A | 3/2017 |
| CN | 106536035 A | 3/2017 |
| CN | 106699485 | 5/2017 |
| CN | 107418586 A | 12/2017 |
| CN | 107922286 A | 4/2018 |
| CN | 108367996 A | 8/2018 |
| CO | 7200058 | 2/2015 |
| DE | 2408410 A1 | 8/1974 |
| DE | 102007049182 B3 | 5/2009 |
| DE | 102009041456 | 3/2011 |
| DE | 102013004597 A1 | 9/2014 |
| EP | 0835161 | 4/1998 |
| EP | 0918045 A1 | 5/1999 |
| EP | 2840074 | 2/2015 |
| FR | 2583412 A1 | 12/1986 |
| GB | 935007 A | 8/1963 |
| GB | 1378938 | 12/1974 |
| GB | 2514233 A | 11/2014 |
| GB | 2522490 | 7/2015 |
| GB | 2522490 A | 7/2015 |
| GB | 2522490 B | 12/2015 |
| GB | 2577865 | 4/2020 |
| GB | 2577865 A | 4/2020 |
| JP | H0255397 | 2/1990 |
| JP | 2003112017 | 4/2003 |
| JP | 2004182549 | 7/2004 |
| JP | 3816870 | 8/2006 |
| KR | 101335445 B1 | 12/2013 |
| SU | 695018 A1 | 6/1982 |
| SU | 990756 A | 1/1983 |
| SU | 990756 A1 | 1/1983 |
| SU | 1574542 A1 | 6/1990 |
| WO | 9629287 | 9/1996 |
| WO | 9629287 A1 | 9/1996 |
| WO | 9730782 | 8/1997 |
| WO | 0121556 A1 | 3/2001 |
| WO | 2006096825 | 9/2006 |
| WO | 2007071175 | 6/2007 |
| WO | 2009086587 A1 | 7/2009 |
| WO | 2011053794 A2 | 5/2011 |
| WO | 2012109723 A1 | 8/2012 |
| WO | 2012115496 A1 | 8/2012 |
| WO | 2013055219 | 4/2013 |
| WO | 2013055219 A1 | 4/2013 |
| WO | 2014026048 A2 | 2/2014 |
| WO | 2014181149 A2 | 11/2014 |
| WO | 2015185907 A1 | 12/2015 |
| WO | 2015185909 A1 | 12/2015 |
| WO | 2016051130 A1 | 4/2016 |
| WO | 2016178211 | 11/2016 |
| WO | 2018073815 | 4/2018 |
| WO | 2018109773 | 6/2018 |
| WO | 2018146684 | 8/2018 |
| WO | 2018154338 | 8/2018 |

OTHER PUBLICATIONS

Bryan D. Coday et al., "The sweet spot of forward osmosis: Treatment of produced water, drilling wastewater, and other complex and difficult liquid streams" Desalination 333 (2014) 23-35.
Canadian Office Action dated Jul. 12, 2018 for corresponding CA Patent App. No. 2,890,360, 5 pages.
Extended European Search Report for Application No. 16789406.2 dated Dec. 14, 2018, 8 pages.
Indian Examination Report dated Jun. 28, 2018 for IN Application No. 829DELNP2015, 6 pages.
International Search Report and Written Opinion dated Dec. 19, 2013 for corresponding International Patent Application No. PCT/US2013/049166. 7 pages.
Office Action dated Jul. 3, 2018 for U.S. Appl. No. 15/559,424 (pp. 1-9).
Omeman, Z. et al., "Geopolymer cement in concrete: novel sustainable", CEMENTO-HORMIGON, 78(906), 4-19 STNDatabase accession No. 2008:130694 XP002777656.
R. L. Earle., "Chapter 8: Evaporation. Multiple Effect Evaporation", Unit Operations in Food Processing, (19831231), URL: http://www.nzifst.org.nz/unitoperations/evaporation2.htm, XP055282974, 18 pages.
RU Office Action dated Jul. 31, 2019 for RU Application No. 2017141009 (4 pages).
RU Office Action dated May 15, 2017 for RU Application No. 2015103308 (9 pages).
RU Search Report dated May 5, 2017 for RU Application No. 2015103308 (2 pages).
Russian Search Report for Application No. RU2017141009, dated Jul. 10, 2019, 2 pages.
Unit Operations in Food Processing—R. L Earle, 1983, NZIFST, http://www.nzifst.org.nz/unitoperations/evaporation2.htm. 7 pages.
Written Opinion of the International Search Authority for parent PCT application PCT/IL2016/050436, 6 pages.
Written Opinion of the International Search Authority for parent PCT application PCT/IL2017/050358 dated Jun. 25, 2017, 6 pages.

(56) References Cited

OTHER PUBLICATIONS

Written Opinion of the International Search Authority for parent PCT application PCT/IL2014/050278, dated Sep. 14, 2015. 6 pages.
Database WPI, Week 198346 Thomson Scientific, London, GB; AN 1983-819450, XP002801001, & SU 990 756 A (Kaluga Khlorvinil) Jan. 23, 1983 (Jan. 23, 1983) (1 page).
Extended European Search Report for App. No. EP18751114.2, dated Nov. 20, 2020, 8 pages.
Notice of Allowance dated Sep. 16, 2020 for U.S. Appl. No. 16/481,183 (pp. 1-9).
Office Action dated Aug. 25, 2020 for U.S. Appl. No. 16/343,900 (pp. 1-5).
Office Action dated Aug. 4, 2020 for U.S. Appl. No. 15/570,753 (pp. 1-13).
Office Action dated Sep. 25, 2020 for U.S. Appl. No. 16/343,900 (pp. 1-4).
Corrected Notice of Allowability dated Dec. 21, 2020 for U.S. Appl. No. 16/481,183 (pp. 1-2).
Office Action dated Jan. 12, 2021 for U.S. Appl. No. 16/343,900 (pp. 1-4).
Chile Office Action (with English translation) for App. No. CL02247-2019, dated Jan. 7, 2021, 16 pages.
Notice of Allowance dated Jan. 26, 2021 for U.S. Appl. No. 16/343,900 (pp. 1-5).
Brazilian Office Action (with English translation) for App. No. BR112019008082-1, dated Jul. 12, 2021, 8 pages.
Colombian Office Action for App. No. NC2019/0009684, dated Jun. 24, 2021, 6 pages.
Study on the phase change of gypsum in fertilizer salt and the granulation mechanism of compound fertilizer, Huanghua, Master's degree thesis of Shanxi Normal University Aug. 31, 2014, pp. 37-41.
ARIPO Search Report for App. No. AP/P/2019/011816, dated May 25, 2021, 4 pages.
Brazilian Office Action for App. No. BR112018007847-6, dated Apr. 22, 2021, 4 pages.
Chinese Office Action (with English translation) for App. No. CN2017800029016, dated Mar. 16, 2021, 28 pages.
Chinese Office Action (with English translation) for App. No. CN201780065167.8, dated May 28, 2021, 15 pages.
Corrected Notice of Allowability dated Feb. 19, 2021 for U.S. Appl. No. 16/343,900 (pp. 1-2).
English version of Chinese Office Action for App. No. CN2018800081429, dated May 24, 2021, 4 pages.
Indonesian Patent Office Action for App. No. PID201906345, dated Apr. 1, 2021, 4 pages.
Mu Changrong, et al., "Production and Application Technology of Compound Fertilizer", Chengdu University of Science and Technology Press, Dec. 1994, 1st edition, p. 131, 4 pages.
Wu Yuguang et al., "Guide to the Use of Chemical Fertilizers", China Agriculture Press, Sep. 2000, 1st edition, p. 112, 4 pages.
Xu Jinga, et al., "Series of Books on New Production Technology for Compound Fertilizer and Functional Fertilizer and Application Technology Thereof, Production Process Technology," Chemical Industry Press, first edition, Sep. 2000, p. 84, 5 pages.
"Compendium of Polysulphate scientific research", Potash House, P.O. Box 75, Beer-Sheva 8410001, Israel, www.polysulphate.com (Dec. 31, 2016) 88 pages.
Chinese Office Action (with English translation) in App. No. CN201780084381.8, dated Jul. 16, 2021, 11 pages.
Colombian Search Report for App. No. NC2019/0015080, dated Jun. 24, 2021, 7 pages.
Extended European Search Report for App. No. EP18817032.8, dated Feb. 25, 2021, 7 pages.
Indian Office Action for App. No. IN201927054628, dated Jun. 11, 2021, 6 pages.
Indonesian Office Action (with English translation) for App. No. P00202000013, dated Jul. 23, 2021, 7 pages.
Powder handling & processing, Compaction in Fertilizer Production, "Compaction-Granulation of Fertilizer. An Economical Process for a la carte Formulations", vol. 11 (3), Jul./Sep. 1999 (Sep. 30, 1999) 4 pages.
Albadarin, Ahmad B. et al., "Granulated polyhalite fertilizer caking propensity", Powder Technology, vol. 308, (Dec. 8, 2016), pp. 193-199, URL: https://doi.org/10.1016/j.powtec.2016.12.004, XP029890407.
Chinese Office Action (with English translation) for App. No. CN201880047533.1, dated Aug. 24, 2021, 10 pages.
English version of Chinese Office Action for App. No. CN2017800029016, dated Nov. 16, 2021, 12 pages.
ARIPO Search Report for App. No. AP/P/2019/011816, dated Nov. 14, 2021, 1 page.
Chinese Office Action (with English translation) for App. No. CN201780065167.8, dated Jan. 6, 2022, 8 pages.
Chinese Office Action (with English translation) for App. No. CN201880089257.5, dated Dec. 24, 2021, 16 pages.
Chinese Office Action (with English translation) for App. No. CN201980021914.7, dated Jan. 6, 2022, 10 pages.
European Patent Office Communication pursuant to Article 94(3) EPC for App. No. EP17801109.4, dated Dec. 1, 2021, 2 pages.
Examination Report for App. No. GB1909749.2, dated Jan. 10, 2022, 2 pages.

\* cited by examiner

PROCESS FOR THE PRODUCTION OF POTASSIUM SULPHATE AND MAGNESIUM SULPHATE FROM CARNALLITE AND SODIUM SULPHATE

FIELD OF THE INVENTION

The present invention relates to the field of fertilizers derived from any material of natural or synthetic origin that is applied to soils or to plant tissues to supply one or more plant nutrients essential to the growth of plants, specifically to production of potassium sulphate which is a key ingredient in the fertilizer industry.

BACKGROUND OF THE INVENTION

To grow properly, plants need nutrients (nitrogen, potassium, calcium, zinc, magnesium, iron, manganese, etc.) which normally can be found in the soil. Sometimes fertilizers are needed to achieve a desired plant growth as these can enhance the growth of plants.

This growth of plants is met in two ways, the traditional one being additives that provide nutrients. The second mode by which some fertilizers act is to enhance the effectiveness of the soil by modifying its water retention and aeration. Fertilizers typically provide, in varying proportions, three main macronutrients:

Nitrogen (N): leaf growth;

Phosphorus (P): Development of roots, flowers, seeds, fruit;

Potassium (K): Strong stem growth, movement of water in plants, promotion of flowering and fruiting;

three secondary macronutrients: calcium (Ca), magnesium (Mg), and sulphur (S);

micronutrients: copper (Cu), iron (Fe), manganese (Mn), molybdenum (Mo), zinc (Zn), boron (B), and of occasional significance there are silicon (Si), cobalt (Co), and vanadium (V) plus rare mineral catalysts.

The most reliable and effective way to make the availability of nutrients coincide with plant requirements is by controlling their release into the soil solution, using slow release or controlled release fertilizers.

Both slow release fertilizers (SRF) and controlled release fertilizers (CRF) supply nutrients gradually. Yet, slow release fertilizers and controlled release fertilizers differ in many ways: The technology they use, the release mechanism, longevity, release controlling factors and more.

Solid fertilizers include granules, prills, crystals and powders. A prilled fertilizer is a type of granular fertilizer that is nearly spherical made by solidifying free-falling droplets in air or a fluid medium. Most controlled-release fertilizers (CRFs) used in commercial nurseries are prilled fertilizers that have been coated with sulfur or a polymer. These products have been developed to allow a slow release of nutrients into the root zone throughout crop development.

Amongst the various fertilizers there is a dominant use of potassium sulfate. $K_2SO_4$ does not contain chloride, which can be harmful to some crops. Potassium sulfate is preferred for these crops, which include tobacco and some fruits and vegetables. Crops that are less sensitive may still require potassium sulfate for optimal growth if the soil accumulates chloride from irrigation water.

SUMMARY OF THE INVENTION

According to some demonstrative embodiments, there is provided a process for the production Potassium Sulphate (SOP) and Potassium Magnesium Sulphate as a product of reaction between Carnallite ($KClMgCl_2*6H_2O$) and Sodium Sulphate bearing minerals.

According to some embodiments, the process may include recovery of SOP from Sulphate bearing mineral and Carnallite and/or Sylvenite.

According to some embodiments, the process of the present invention may include the following steps:

Dissolving Carnallite in water to obtain Sylvenite and high Magnesium Chloride brine;

Adding Sodium Sulphate in various proportion to Carnallite, e.g., weight ratio Carnalite to Sodium Sulphate 14:3, to produce mixture of Kainte\Leonite, KCl and NaCl precipitant and brine containing $MgCl_2$, KCl, NaCl, e.g., in equilibrium with the solid;

Separating the NaCl from the mixture, e.g., by flotation method or

Obtaining a precipitant mixture of Leonite with KCl,

Filtering the Leonite and washing with water to yield pure mixture of Leonite with KCl;

Adding proper quantity of KCl to the Leonite with the KCl, i.e., a sufficient quantity to convert Leonite to $K_2SO_4$, e.g., weight proportion of Leonite to Potash 3.5:5;

Decompose the Leonite with the KCl to SOP in Crystallizer.

Separating the crude SOP, e.g., using by filtration and/or centrifugation; and

Washing the SOP with water to appropriate grade, e.g., 93-96% $K_2SO_4$.

According to some embodiments, the final SOP may be dried and packaged according to methods known in the art.

According to some demonstrative embodiments the process may include selecting a specific ratio of Water\Carnallite, for example, a ratio of Carnallite to water 2.9:1.7 w/v, to lead to Carnallite decomposition and to $MgCl_2$ brine saturated with KCl.

According to some embodiments, the water may decompose the Carnallite to brine containing $MgCl_2$, KCl and NaCl. According to some embodiments, a minimum quantity of water may dissolve all the above mentioned salts.

According to some embodiments, the process may further include a reaction between a Sulphate anion from a Sulphate mineral coming in contact with the brine thereby producing Kainite, Leonite, and Shenite.

According to some embodiments, the process may further include a reaction between the Carnallite and the Sodium Sulphate to produce mixture of Kainite/Leonite KCl and NaCl.

According to some embodiments, the process may include further separation of the NaCl from the solids of the mixture, for example, by flotation.

According to some embodiments, the process may include addition of water to results in Leonite decomposing to SOP.

DETAILED DESCRIPTION OF THE INVENTION

According to some demonstrative embodiments, there is provided a process for the production Potassium Sulphate (SOP) and Potassium Magnesium Sulphate as a product of reaction between Carnallite ($KClMgCl_2*6H_2O$) and Sodium Sulphate bearing minerals.

According to some embodiments, the process may preferably be used in salt water lakes and/or brines.

According to some embodiments, the process may include recovery of SOP from Sulphate bearing mineral and Carnallite and/or Sylvenite.

According to some embodiments, the process of the present invention may include the following steps:

Dissolving Carnallite in water to obtain Sylvenite and high Magnesium Chloride brine;

Adding Sodium Sulphate in various proportion to Carnallite to produce mixture of Kainte\Leonite, KCl and NaCl precipitant and brine containing $MgCl_2$, KCl, NaCl, e.g., in equilibrium with the solid;

Separating the NaCl from the mixture;

Obtaining a precipitant mixture of Leonite with KCl, e.g., by flotation method;

Filtering the Leonite and washing with water to yield pure mixture of Leonite with KCl;

Adding proper quantity of KCl to the Leonite with the KCl;

Decompose the Leonite with the KCl to SOP in Crystallizer.

Separating the crude SOP, e.g., using by filtration and/or centrifugation; and

Washing the SOP with water to appropriate grade.

According to some embodiments, the final SOP may be dried and packaged according to methods known in the art.

According to some demonstrative embodiments the process may include selecting a specific ratio of Water\Carnallite to lead to Carnallite decomposition and to $MgCl_2$ brine saturated with KCl. According to some embodiments, the process may further include a reaction between a Sulphate anion from a Sulphate mineral coming in contact with the brine thereby producing Kainite, Leonite, and Shenite.

According to some embodiments, the process may further include a reaction between the Carnallite and the Sodium Sulphate to produce mixture of Kainite\Leonite KCl and NaCl.

According to some embodiments, the process may include further separation of the NaCl from the solids of the mixture, for example, by flotation.

According to some embodiments, the process may include addition of water to results in Leonite decomposing to SOP.

According to some embodiments, the decomposition of Leonite to SOP can also be carried out by adding only water, which will yield SOP and Magnesium Sulphate brine.

According to some demonstrative embodiments, Magnesium Sulphate salt can also produce from the above referenced brine.

EXAMPLES

Examples—1

2000 gr of Carnallite containing 5% NaCL and 5% adhering moisture mixed at 35° C. with 1200 gr of water. The suspension has been stirred for 1 hour. 142 gr of Na2SO4 has been added and stirring continue for 120 minutes at 35° C. The result suspension was separate and the solid 490 gr and the brine sent to analysis.

Solid composition in wt %:
NaCl—20.5
KCl—58.7
Kainite—20.8
Brine composition in mol/1000 mol $H_2O$:
$Na_2Cl_2$—10.2
$K_2Cl_2$—9.8
$MgSO_4$ 7.7
$MgCl_2$—50.2.

Example—2

2000 gr of Carnallite 5% NaCl 5% adhering moisture mixed at 35° C. with 1200 gr of water. The suspension has been stirred for 1 hour. 284 gr of $Na_2SO_4$ has been added and stirring continue for 120 minutes at 35° C. The result suspension was separate and the solid 608 gr and the brine sent to analysis.

Solid composition in wt %:
NaCl—33.6
KCl—43.3
Leonite—23.1
Brine composition in mol/1000 mol $H_2O$:
$Na_2Cl_2$—10.9
$K_2Cl_2$—10.8,
$MgSO_4$—13.1
$MgCl_2$—46.5.

Example—3

2000 gr of Carnallite 5% NaCl 5% adhering moisture mixed at 35° C. with 1200 gr of water. The suspension has been stirred for 1 hour. 426 gr of $Na_2SO_4$ has been added and stirring continue for 120 minutes at 35° C. The result suspension was separate and the solid 811 gr and the brine sent to analysis.

Solid composition in wt %:
NaCl—42.7
KCl—25.3
Leonite—32.
Brine composition in mol/1000 mol $H_2O$:
$Na_2Cl_2$—11.5
$K_2Cl_2$—11.4
$MgSO_4$—19.3
$MgCl_2$—40.3.

Example—4

2000 gr of Carnallite 5% NaCl 5% adhering moisture mixed at 35° C. with 1200 gr of water. The suspension has been stirred for 1 hour. 568 gr of $Na_2SO_4$ has been added and stirring continue for 120 minutes at 35° C. The result suspension was separate and the solid 811 gr and the brine sent to analysis.

Solid composition in wt %:
NaCl—42.8
KCl—10
Leonite—47.2.
Brine composition in mol/1000 mol $H_2O$:
$Na_2Cl_2$—14.3
$K_2Cl_2$—12.4
$MgSO_4$—18.4
$MgCl_2$—36.3

Example—5

2778 gr of Carnallite was added to 8580 gr of brine with a composition of:
21.6 $Na_2Cl_2$
10.57 $K_2Cl_2$ 14.91 $MgSO_4$
23.16 $MgCl_2$
the resulting suspension was mixed for 30 minutes.

1440 gr of $Na_2SO_4$ were gradually added in three steps. The suspension was mixed for 30 minutes after each step.

The suspension was then mixed for additional 30 minutes and then pumped directly to Denver D-10 flotation cell and the NaCl was floated. The product composition contained 1367 gr of Leonite and 248 gr of NaCl.

Example—6

The same process of example 5 was applied with regard to mixing of 2778 gr of Carnallite with a brine having a composition of:

21.6 $Na_2Cl_2$
10.57 $K_2Cl_2$
14.91 $MgSO_4$
23.16 $MgCl_2$.

The final resulting product contained: 1351 gr of Leonite and 297.4 gr NaCl.

While this invention has been described in terms of some specific examples, many modifications and variations are possible. It is therefore understood that within the scope of the appended claims, the invention may be realized otherwise than as specifically described.

The invention claimed is:

1. A process for the recovery of SOP from sulphate bearing mineral carnallite, comprising:
   dissolving said carnallite in water to obtain sylvenite and high magnesium chloride brine;
   adding sodium sulphate to said dissolved carnallite to produce mixture of kainite\leonite, KCl and NaCl precipitant and brine containing $MgCl_2$, KCl, NaCl;
   separating the NaCl from the mixture;
   obtaining a precipitant mixture of leonite with KCl;
   filtering said leonite and washing with water to yield pure mixture of leonite with KCl;
   adding KCl to the leonite with the KCl; and
   decomposing said leonite with the KCl to SOP.

2. The process of claim 1, wherein said SOP is separated from said mixture using a method selected from the group including filtration and centrifugation.

3. The process of claim 2, wherein said SOP is further washed with water to yield an appropriate grade.

4. The process of claim 3, wherein said SOP is further dried and packaged.

5. The process of claim 1, wherein said sodium sulphate is added in a proportion to said dissolved carnallite to yield said mixture of kainite\leonite.

6. The process of claim 1, wherein said precipitant mixture of leonite with KCl is obtained by a floatation method.

7. The process of claim 1, wherein said leonite with the KCl is decomposed to SOP in a crystallizer.

* * * * *